(12) United States Patent
Bresolin

(10) Patent No.: US 6,415,103 B2
(45) Date of Patent: Jul. 2, 2002

(54) THERMOSTATIC HEATING DEVICE FOR LIQUIDS, PROVIDED WITH A RECIRCULATION PUMP

(75) Inventor: Valerio Bresolin, Bassano del Grappa (IT)

(73) Assignee: Hydor S.R.L., Bassano del Grappa (IT)

( * ) Notice: Subject to any disclaimer, the term of this patent is extended or adjusted under 35 U.S.C. 154(b) by 0 days.

(21) Appl. No.: 09/883,462

(22) Filed: Jun. 18, 2001

(30) Foreign Application Priority Data

Jun. 29, 2000 (IT) .......................................... VE00U0013

(51) Int. Cl.[7] ................................................. F24H 1/08
(52) U.S. Cl. ........................ 392/471; 392/478; 210/184
(58) Field of Search ................................. 392/465, 471, 392/478, 479; 210/167, 169, 184, 186, 416.2; 119/229, 262

(56) References Cited

U.S. PATENT DOCUMENTS

| 3,816,026 | A | * | 6/1974 | Isaacson et al. ............ 210/169 |
| 4,563,571 | A | * | 1/1986 | Koga et al. .................. 219/543 |
| 4,855,569 | A | * | 8/1989 | Wiedemann ................. 392/461 |
| 5,238,367 | A | * | 8/1993 | Ellis et al. ................ 210/416.2 |
| 5,514,280 | A | * | 5/1996 | Logan ......................... 119/260 |
| 6,106,709 | A | * | 8/2000 | Bresolin ..................... 119/259 |

* cited by examiner

Primary Examiner—Teresa Walberg
Assistant Examiner—Thor Campbell
(74) Attorney, Agent, or Firm—Hoffman, Wasson & Gitler PC

(57) ABSTRACT

A thermostatic heating device for liquids, provided with a recirculation pump, comprising a heat-insulating dielectric material outer housing, a heat-conductive dielectric material inner casing, a resistive film interposed between said outer housing and said inner casing, and a tube of heat-conductive material positioned in the interior of said casing, said tube being lowerly open to house an impeller of a pump applied to one end of said cylindrical housing.

5 Claims, 3 Drawing Sheets

THERMOSTATIC HEATING DEVICE FOR LIQUIDS, PROVIDED WITH A RECIRCULATION PUMP

FIELD OF THE INVENTION

This invention relates to a thermostatic heating device for liquids, provided with a recirculation pump.

SUMMARY OF THE INVENTION

An object of the invention is to provide a thermostatic heating device presenting double insulation of the parts under voltage, and hence satisfying existing regulations.

Another object of the invention is to provide a thermostatic heater having high adjustment sensitivity.

Another object of the invention is to provide a thermostatic heater of simple production and of safe and reliable operation even in abnormal situations.

A further object of the invention is to provide a thermostatic heater of smaller dimensions than traditional heaters.

These and further objects which will be apparent from the ensuing description are attained according to the invention by a thermostatic heating device for liquids, provided with a recirculation pump, having:

an outer housing of heat-insulating dielectric material,
an inner casing of heat-conductive dielectric material,
a resistive film interposed between said housing and said casing,
a tube of heat-conductive material positioned in the interior of said casing, said tube having a lower opening to house the impeller of a pump applied at one end of said cylindrical housing, the other end of said tube emerging through an aperture provided in the other surface of said cylindrical housing.

BRIEF DESCRIPTION OF THE DRAWINGS

The invention is further clarified hereinafter with reference to the accompanying drawings, in which.

DESCRIPTION OF A PREFERRED EMBODIMENTS

Figure 1:
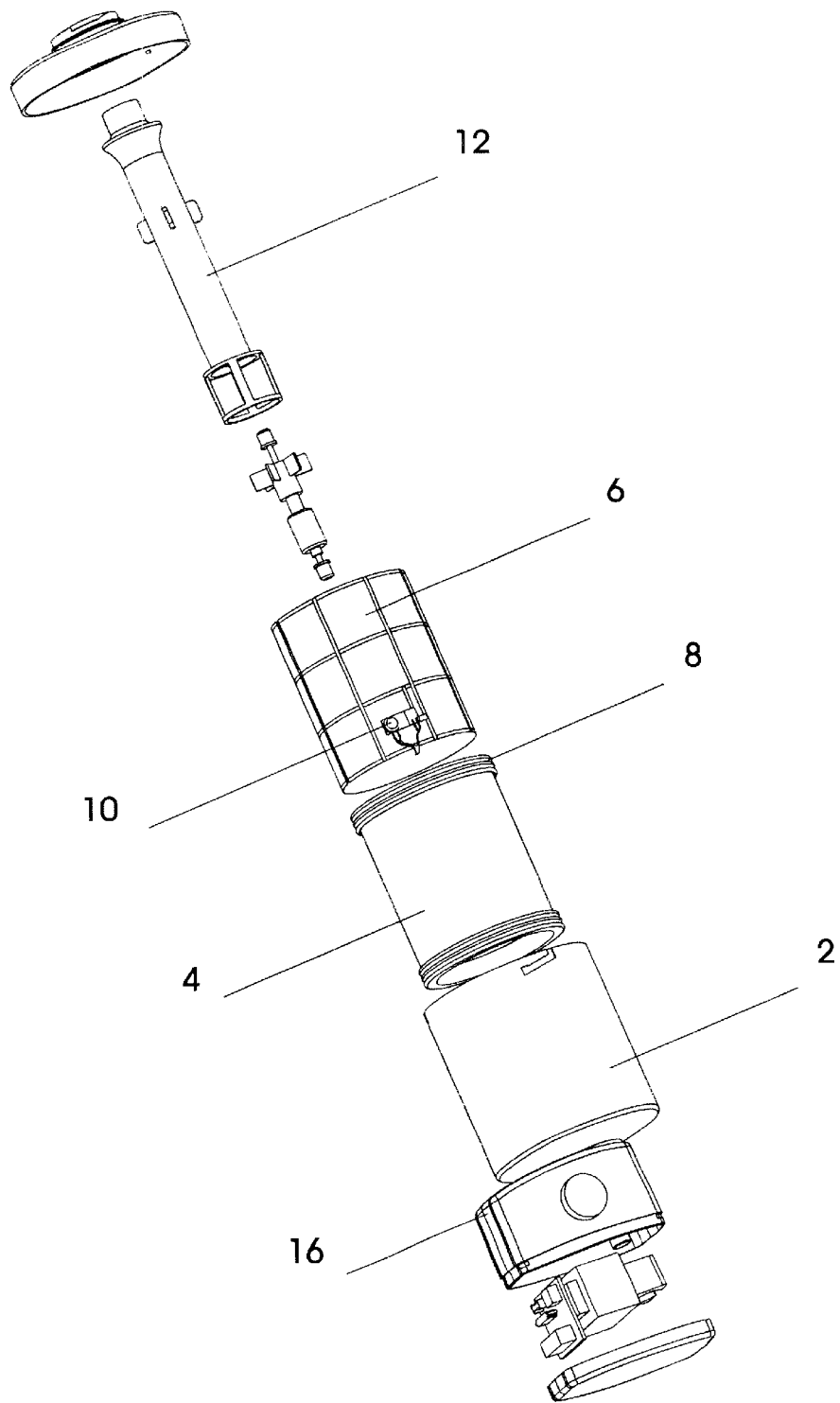
FIG. 1 is an exploded perspective view of a heating device of the invention.
Figure 2:
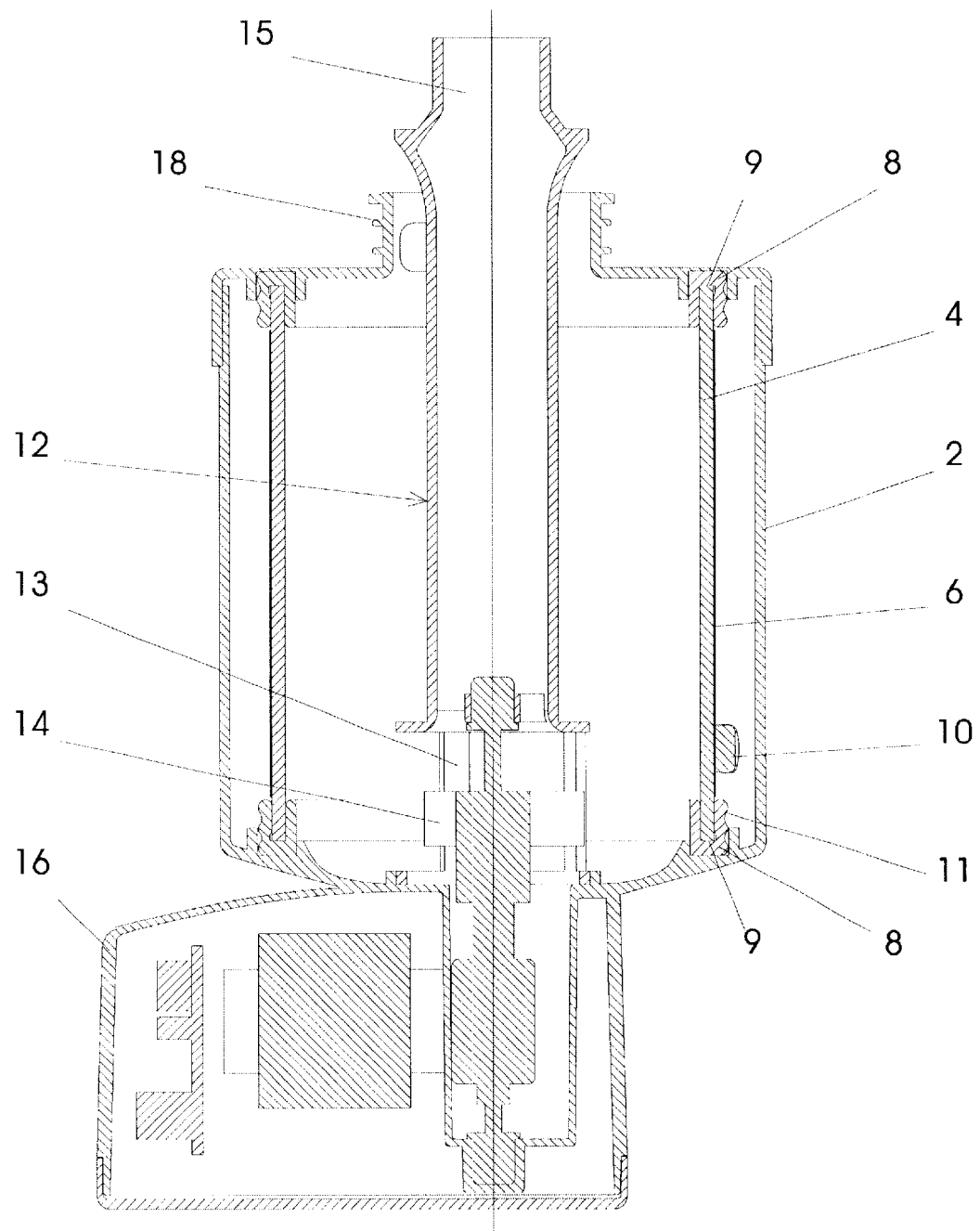
FIG. 2 is a longitudinal section therethrough.
Figure 3:
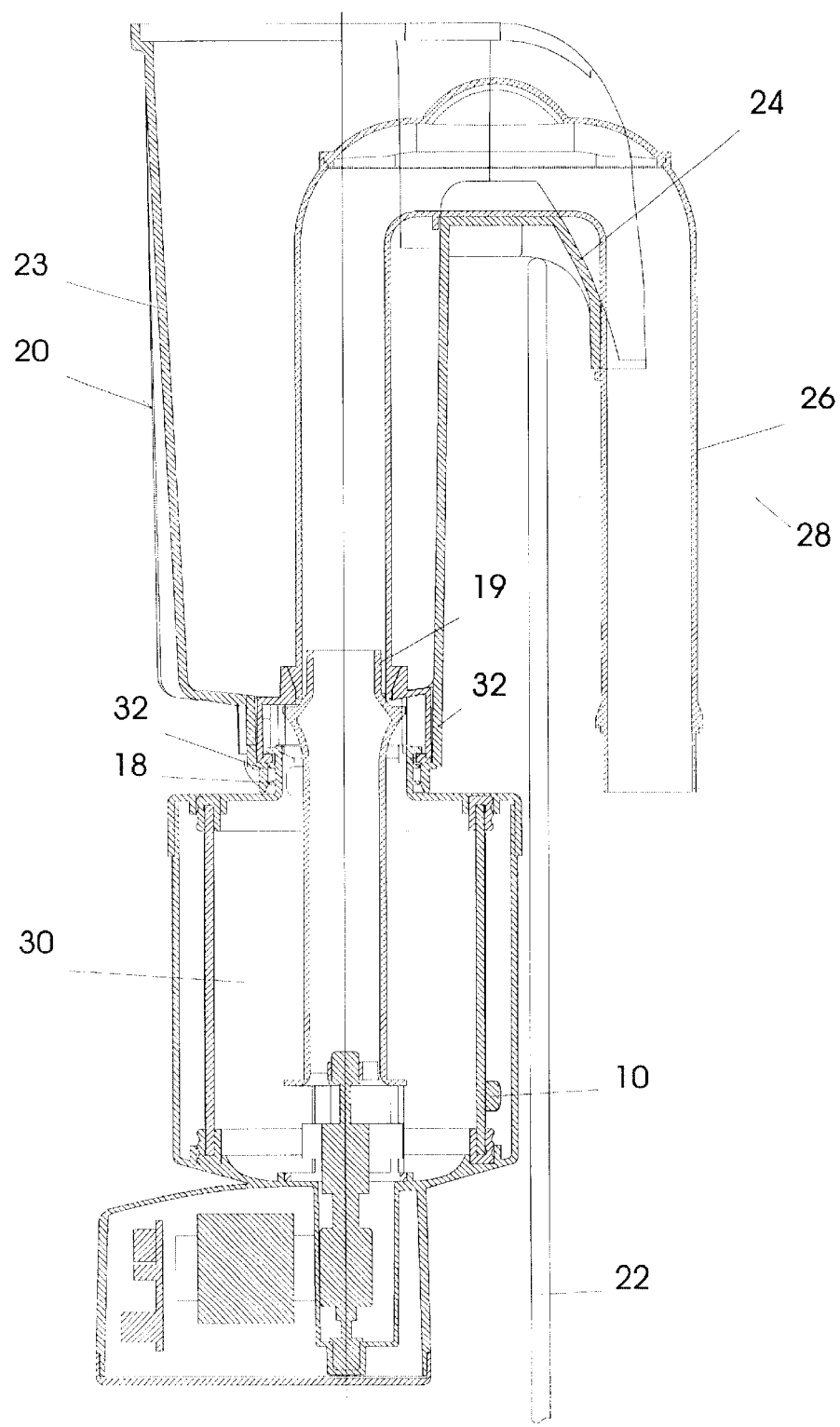
FIG. 3 shows it applied to an aquarium filter.

As can be seen from the figures, the device of the invention comprises a cylindrical casing 2 of heat-insulating dielectric material, in the interior of which there is a tubular support 4 formed of electrically insulating, heat-conductive rigid material on which a heating element, indicated overall by 6, is wound.

The tubular support 4 is preferably a piece of cylindrical glass tube open at its ends, on which there are applied two annular gaskets 8, preferably of rubber, which present an annular seat 9 for housing the edges of the glass support, and have on their outer annular surface a plurality of parallel circumferential ribs 11 which form a substantial seal against the cylindrical casing 2.

The heating element 6 preferably consists of a polyester film on which a PTC resistive ink has been printed by traditional silk-screen printing to cover the entire support surface with the exception of a small region to which a temperature sensor 10 is bonded.

The interior of the tubular support houses a plastic tube 12 having its lower end 13 substantially open to form a seat for the impeller 14 of a pump 16 applied to the bottom of the casing.

The other end 15 of the tube 12 emerges from the casing 2 at a threaded collar 18 present on the upper surface of the casing, and is provided with a portion 19 of smaller diameter.

In particular the device is applied to the bottom of a filtering device 20 of the type to be hung onto the outside of the aquarium 22 and commonly known as a "power filter" or "hang-on filter".

This filter comprises a bow casing 23 containing a filtering mass and provided with a wide hook 24 by which it is hung on the upper edge of a vertical wall of the aquarium so that it remains on the outside of the aquarium. A U-tube 26 is applied to the casing 23, to extend into the interior of the aquarium parallel to said wall and dip into the contained water 28.

The portion 19 of the tube 12 is inserted into said tube 26 by engaging the threaded collar 18 with a corresponding internally threaded bush provided on the base of the filtering device.

The device of the invention operates in the following manner: the electric motor drives the impeller 14 which pushes the water contained in the interspace 30 between the support 4 and tube 12 into the filter contained in the filtering device 20.

From this, the water passes beyond the upper edge of the hook appendix to cascade back into the aquarium 22. At the same time the pressure created by the impeller 14 draws new water from the aquarium and through the tube 26, to be heated in the interior of the chamber 30 by the PTC resistor.

If the electricity supply is interrupted for any reason, the impeller stops and the water contained in the tube 26 immersed in the aquarium falls by gravity into the aquarium and by syphon effect also drags with it the water contained in the device to hence cause temporary depriming of the pump.

From the aforegoing it is apparent that the heating device of the invention presents numerous advantages, and in particular:

it enables axial heating to be achieved with only small overall dimensions by virtue of the outward and return path undergone by the water through its interior, it is highly reliable due to the cylindrical casing 2, which forms a protective shell for the heater, it is of highly versatile adjustment as the sensor 10 is located in a region in which the water is in movement.

What is claimed is:

1. A thermostatic heating device for liquids, provided with a recirculation pump, comprising:

a heat-insulating dielectric material outer housing,
a heat-conductive dielectric material inner casing,
a resistive film interposed between said outer housing and said inner casing,
a tube of heat-conductive material positioned in an interior of said inner casing, said tube having a lower opening to house an impeller of the pump applied at one end of said housing, an other end of said tube emerging through an aperture provided in an other end of said housing.

2. The thermostatic heating device as claimed in claim 1, wherein said housing and said casing are of cylindrical shape.

3. The thermostatic heating device as claimed in claim 1, wherein said resistive film consists of a PTC resistive ink printed onto a polyester film.

4. The thermostatic heating device as claimed in claim 1, further comprising a temperature sensor in series with said resistive film and applied to said casing.

5. The thermostatic heating device as claimed in claim 1, wherein said aperture through which the other end of the tube emerges is provided with a coupling engagable in a filtering device.

* * * * *